United States Patent
Annan et al.

(10) Patent No.: US 9,220,011 B1
(45) Date of Patent: Dec. 22, 2015

(54) ELECTRONIC DEVICE THEFT SELF-DETECTION AND LOCKING

(71) Applicant: Sprint Communications Company L.P., Overland Park, KS (US)

(72) Inventors: Brandon C. Annan, Westwood Hills, KS (US); John E. Belser, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/073,341

(22) Filed: Nov. 6, 2013

(51) Int. Cl.
  *H04W 12/12* (2009.01)
  *H04W 12/08* (2009.01)

(52) U.S. Cl.
  CPC ..................... *H04W 12/08* (2013.01)

(58) Field of Classification Search
  CPC .................................... H04W 12/08
  See application file for complete search history.

(56) References Cited

U.S. PATENT DOCUMENTS

| | | | |
|---|---|---|---|
| 6,606,491 B1 * | 8/2003 | Peck | 455/411 |
| 8,295,812 B1 * | 10/2012 | Jones | 455/411 |
| 8,483,659 B2 * | 7/2013 | Mahajan | 455/411 |
| 2006/0105809 A1 * | 5/2006 | Luo | 455/558 |
| 2009/0249497 A1 * | 10/2009 | Fitzgerald et al. | 726/35 |
| 2013/0157715 A1 * | 6/2013 | Zheng et al. | 455/551 |
| 2013/0181219 A1 * | 7/2013 | Fang et al. | 257/48 |
| 2014/0148127 A1 * | 5/2014 | Qian | 455/411 |

* cited by examiner

Primary Examiner — Benny Q Tieu
Assistant Examiner — Michael Y Tzeng (57) ABSTRACT

A mobile communication device that detects and responds to theft is disclosed. The mobile communication device comprises at least a cellular radio transceiver, a processor, a memory, wherein the memory comprises a user partition and a system partition, and an operating system kernel stored in the system partition of the memory. When executed by the processor, the operating system kernel prevents unprivileged users from accessing the system partition and determines a theft status of the mobile communication device or of at least one hardware component of the mobile communication device. When a theft status is determined, the operating system kernel performs at least one theft response selected from preventing boot-up of the mobile communication device, sending a message via the cellular radio transceiver, commanding presentation of a theft alert message on a display of the mobile communication device.

13 Claims, 8 Drawing Sheets

ELECTRONIC DEVICE THEFT SELF-DETECTION AND LOCKING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are electronic devices used for mobile voice or data communications based on a network connectivity provided by base transceiver stations also known as cell towers or cell sites. Electronic devices may have a system memory partition which stores an operating system package and fundamental communication applications for operating the electronic device. The operating system protects the system partition by restricting read/write access to privileged users, for example to administrators of an original equipment manufacturer (OEM) of the electronic device. Electronic devices may also have a user memory partition which provides for user data such as third party applications downloaded by an electronic device user. The operating system may permit read/write access to the user memory partition to normal users, for example unprivileged users or users with normal privileges.

SUMMARY

In an embodiment, a mobile communication device that detects and responds to theft is disclosed. The mobile communication device comprises a cellular radio transceiver, a processor, and a memory, wherein the memory comprises a user partition and a system partition. The mobile communication device also comprises an operating system kernel stored in the system partition of the memory that, when executed by the processor, prevents unprivileged users from accessing the system partition. The operating system kernel also determines a theft status of the mobile communication device or of at least one hardware component of the mobile communication device. When a theft status is determined, the operating system kernel performs at least one theft response selected from preventing boot up of the mobile communication device, sending a message via the cellular radio transceiver indicating the theft status, commanding presentation of a theft alert message on a display of the mobile communication device, and disabling input functions of the mobile communication device.

In an embodiment, a method of unlocking a mobile communication device is disclosed. The method comprises sending an unlock command to the mobile communication device using a dual tone multi frequency communications. The method also comprises transmitting a service provider application to the mobile communication device, wherein when executed by the mobile communication device the service provider application resets the mobile communication device to a factory default state, whereby the mobile communication device is unlocked and returned to factory settings.

In an embodiment, a method of presenting a notification of device theft on a mobile communication device is disclosed. The method comprises receiving a lock command on the mobile communication device from a network or operating system kernel located within a system memory partition of the mobile communication device; in response to receiving a lock command from a network or detecting by an operating system kernel located within a system memory partition of the mobile communication device of the mobile communication device that is stolen; performing an override on the mobile communication device, disabling a function of the mobile communication device. The method also comprises sending a message back to the network reporting the mobile communication device as stolen. The method also comprises presenting a message on both an electrophoretic display and a main display of the mobile communication device indicating that the mobile communication device is stolen.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system for electronic device theft self-detection and locking. The disclosure describes a mobile communication device that is informed that it has been stolen by a message received from the wireless network or self-determines that it has been stolen. When the device state is stolen, the device responds to this stolen state. To detect theft, the mobile communication device may go through a theft detection process. The mobile communication device may comprise at least a cellular radio transceiver, a processor, and a memory. The memory may comprise a user partition and a system partition. The system partition may comprise an operating system kernel that when executed by the processor prevents unprivileged users from accessing the system partition.

The operating system kernel may comprise an application which during the boot up of the mobile communication device may determine a theft status of the mobile communication device by conducting an internal check of some of the components of the mobile communication device by comparing an identity of the device known to the operating system to an electronic serial number (ESN) or mobile equipment identity (MEID) that may be stored in some of the components of the mobile communication device. If the application detects that the mobile communication device has been tampered with and had a new component retrofitted into the mobile communication device to replace an existing component, e.g. data stored by a component disagrees with the associated identity information known to the operating system kernel, the mobile communication device may perform any of several theft responses. These theft responses may include preventing boot-up of the mobile communication device, disabling inputs such as keys on a keyboard of the mobile communication device, sending a message via the cellular radio transceiver indicating a theft status, commanding presentation of a theft alert message on a main display and/or an electrophoretic display of the mobile communication device, and disabling input functions of the mobile communication device, thus locking the mobile communication device from uninhibited use. In some contexts, this may be referred to as determining a theft status of the device based on a local source of information in the mobile communication device. In an embodiment, the operating system kernel itself may be capable of detecting theft and enabling the aforementioned theft responses in a substantially similar manner without the use of the application.

In an embodiment, the operating system kernel and/or the application may be able to detect a theft status of the device by making inferences unconnected with the above described internal checks of components of the mobile communication device. For example, the operating system kernel may detect a different pattern of usage and/or a flushing of contact information and building of different new contact information and infer that the mobile communication device has been stolen. In response to making a provisional inference that the device may be stolen, the operating system kernel may prompt a user of the mobile communication device to enter a secret token known only to the legitimate and/or registered user of the device, for example a wireless communication service provider personal identification number (PIN) assigned to the user or some other kind of confidential information. If the user provides the PIN, the provisional inference that the device may be stolen is rejected; if the user does not provide the PIN, the operating system kernel confirms the inference that the device is stolen and takes action such as locking the mobile communication device. In some contexts, this may be referred to as determining a theft status of the device based on a local source of information in the mobile communication device.

The disclosure describes a method of unlocking a mobile communication device, for example a device that has been locked as described above. The method may be performed in part by a locked mobile communication device that is recovered and returned to a user who brings the mobile communication device into a service provider retail store to have the mobile communication device unlocked. In an embodiment, the method for unlocking comprises a retail clerk sending an unlock command to the mobile communication device using dual-tone multi frequency communications that partially unlocks the phone. The unlock command comprises data that is distinct and/or unique to the mobile communication device, for example, information comprising the electronic serial number (ESN) and/or the mobile equipment identity (MEID) of the mobile communication device. In an embodiment, information that is quasi-unique may be used, for example an identifier or key that may be assigned to few but more than only one mobile communication device. Such quasi-unique data may be referred to as distinct data. The method further comprises the retail clerk transmitting a service provider application to the mobile communication device that when executed by the mobile communication device returns the mobile communication device to a factory default state, thereby unlocking the device.

The disclosure describes a method for presenting a notification of device theft on a mobile communication device. The method comprises the mobile communication device receiving a lock command from a network or detecting on the mobile communication device that it is stolen by an operating system kernel located within a system memory partition of the mobile communication device. The method may also comprise a user of the mobile communication device contacting a service provider and informing the service provider that the mobile communication device has been stolen. In response to this information, the service provider sends a request to the mobile communication device to perform lock functions. When the mobile communication device receives the lock command, the mobile communication device performs a lock function of the mobile communication device. The method may further comprise the mobile communication device sending a message back to the network reporting the mobile communication device as stolen. The method further comprises presenting a message on an electrophoretic display and/or a main display of the mobile communication device indicating that the mobile communication device is stolen.

With the mobile communication device that has the capacity to self-detect theft, users of mobile communication devices that are stolen will be able to worry less that their confidential information will be stolen. The capability to self-detect theft on a mobile communication device will ensure users that their mobile communication devices are protected if users lose the mobile communication device or have the mobile communication device stolen from them.

Figure 1:
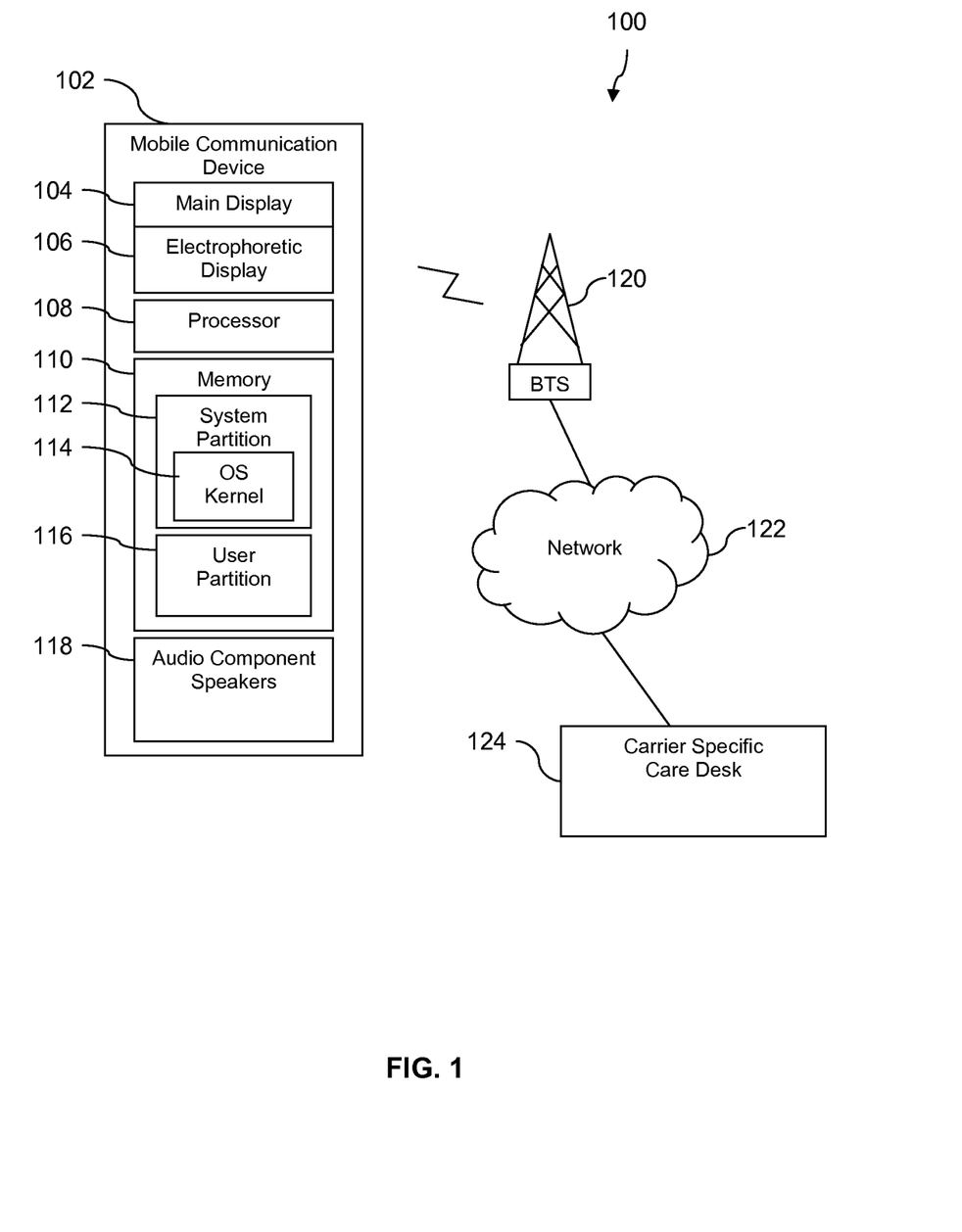
FIG. 1 is a block diagram of a system according to an embodiment of the disclosure

Turning now to FIG. 1, a communication system 100 is described. The system 100 comprises a mobile communication device 102. In an embodiment the mobile communication device 102 may comprise a main display 104, an electrophoretic display 106, a processor 108, a memory 110, and an audio component speaker 118. In an embodiment, the main display 104 is the display that is shown when the mobile communication device 102 is powered on. In an embodiment, the electrophoretic display 106 is the display that remains persistent after the mobile communication device 102 is powered off. The memory 110 may further comprise a system partition 112 and a user partition 116. The system partition 112 may further comprise an operating system kernel 114. In an embodiment, the mobile communication device 102 may comprise a mobile phone, a personal digital assistant (PDA), a media player, or other communication enabled portable electronic devices. In an embodiment, the mobile communication device 102 may be implemented as a handset. Details of handsets are discussed in more detail hereinafter.

The system 100 may further comprise a base transceiver station (BTS) 120, a network 122, and a carrier specific care desk 124. In an embodiment, the base transceiver station (BTS) 120 may provide a wireless communication link to the mobile communication device 102 and may link the mobile communication device 102 to the network 122. In an embodiment, the base transceiver station 120 may provide a wireless communication link to the mobile communication device according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 120 and a single mobile communication device 102 are illustrated in FIG. 1, it is understood that the system 100 may comprise any number of base transceiver stations 120 or mobile communication devices 102. The network 122 may be a public communication network, a private communication network, or a combination thereof.

In an embodiment, a user may lose or have the mobile communication device 102 stolen. If so, the user may contact a carrier specific care desk 124 to inform them of the status of the missing mobile communication device 102. In an embodiment, the carrier specific care desk 124 may be a care center that receives phone calls and emails about missing mobile communication devices. Once the carrier specific care desk 124 receives the information that the mobile communication device 102 is missing, the carrier specific care desk 124 attempts to send a notification to the mobile communication device 102 to inform the mobile communication device 102 of its missing or stolen status. Once the mobile communication device 102 receives this notification, the mobile communication device 102 may undergo lock functions.

The notification from the carrier specific care desk 124 may command the mobile communication device 102 to set flags in some of the components of the mobile communication device 102, where a set flag may indicate a stolen status. An unset flag may be a normal or default state and may be consistent with an un-stolen status. Alternatively, the notification may command the mobile communication device 102 to store identification information in a memory of one or more components of the mobile communication device 102, for example a display, a battery, and/or other components. The identification information may comprise one or more of an electronic serial number (ESN) or a mobile equipment identity (MEID). The identification information may comprise an abbreviated or truncated portion of an identity, for example an abbreviated or truncated form of the ESN or MEID of the device.

In an embodiment, the notification alerts some of the components of the mobile communication device 102. Once the components receive the alert, the components conduct an internal check ensuring that a new component has not been retrofitted into the mobile communication device 102 to replace a known component of the mobile communication device 102. When the mobile communication device 102 receives the lock command from the carrier specific care desk 124, the mobile communication device 102 performs a lock function of the mobile communication device 102. In an embodiment, the lock functions may comprise preventing boot up of the mobile communication device 102, disabling inputs such as keys on the keyboard of the mobile communication device 102, sounding an audible alarm via the audio component speakers 118 of the mobile communication device 102, or commanding presentation of a theft alert message on the main display 104 and/or the electrophoretic display 106 of the mobile communication device 102.

In an embodiment, the mobile communication device 102 may be able to self-detect that it is stolen. The mobile communication device 102 is able to self-detect a stolen status by going through a theft detection process. The operating system kernel 114 may comprise an application that may determine a theft status during the boot up of the mobile communication device 102 by conducting an internal check of some of the components of the mobile communication device 102. In an embodiment, the application accomplishes this by comparing the electronic serial number (ESN) or mobile equipment identity (MEID) stored in the system memory partition 112 to corresponding known values of the electronic serial number (ESN) or Mobile equipment identity (MEID) of the components in the mobile communication device 102. It is assumed that the identity information stored in the system memory partition 112 is accurate and not subject to manipulation or spoofing. The components of the mobile communication device 102 that may store an electronic serial number (ESN) or a mobile equipment identity (MEID) may comprise a battery, a display screen, the display(s) 104 and or 106, a subscriber identity module (SIM) card, the internal memory 110, etc.

If the application detects that the mobile communication device 102 has been tampered with and that a new component has been retrofitted into the mobile communication device 102 to replace an existing component, e.g. identity data stored by the component disagrees with the associated identity information known to the application of the operation system kernel 114, the mobile communication device 102 may perform any of several theft responses. These theft responses may comprise preventing boot up of the mobile communication device 102, disabling inputs such as keys on a keyboard of the mobile communication device 102, sending a message indicating a theft status via the cellular radio transceiver to the network 122, commanding a presentation of a theft alert message set on either the main display 104 and/or the electrophoretic display 106 of the mobile communication device 102, and disabling other input functions of the mobile communication device 102.

Figure 2:
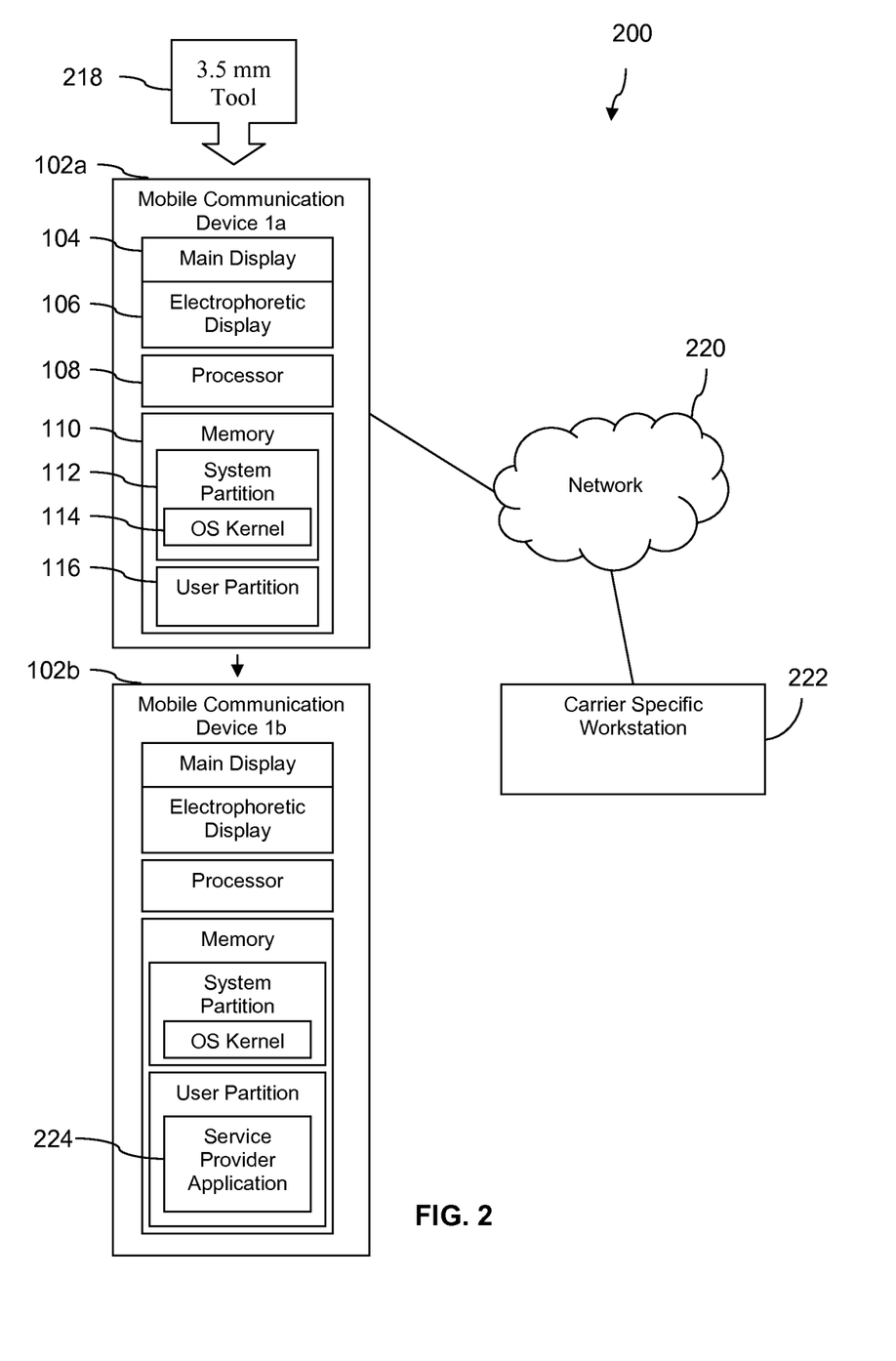
FIG. 2 is a block diagram of a system according to an embodiment of the disclosure.

In FIG. 2, a communication system 200 is described. The system 200 comprises the mobile communication device 102a, a 3.5 mm unlocking tool 218, a network 220, and a carrier specific workstation 222. In an embodiment, the carrier specific workstation 222 may be a computer. Details of computers are discussed further hereinafter. FIG. 2 illustrates the installation of a service provider application 224 onto the mobile communication device 102. It is understood that the mobile communication device 102b corresponds to the same device as the mobile communication device 102a after the service provider application 224 has been installed into the mobile communication device 102. In an embodiment, it is understood that the mobile communication device 102a may use any number of base transceiver stations (BTS) 120 to couple to the network 220.

In an embodiment, a user who reported the mobile communication device 102a as lost or stolen is able to recover the mobile communication device 102a. When the mobile communication device 102a is reported as lost or stolen, the mobile communication device 102a may lock itself. When the mobile communication device 102a is recovered, the user may bring the mobile communication device 102a into the carrier specific workstation 222 at the service provider retail store that services the user to have the mobile communication device 102a unlocked.

In an embodiment, the unlocking of the mobile communication device 102a comprises a retail clerk sending an unlock command to the mobile communication device 102a using dual-tone multi-frequency communications in the form of the 3.5 mm unlocking tool 218 that is inserted into a hardware connector of the mobile communication device 102a that partially unlocks the mobile communication device 102a. In an embodiment, the 3.5 mm unlocking tool 218 uses dual tone multi-frequency communications to send the unlock command to the mobile communication device 102a. In an embodiment, the unlock command may be transmitted using communication signals other than the dual-tone multi-frequency signal.

In an embodiment the unlock command of the 3.5 mm unlocking tool 218 comprises data that is specific to the mobile communication device 102a. In an embodiment, the data that is distinct and/or unique to the mobile communication device 102a is based on or encodes one of an electronic serial number (ESN) or a mobile equipment identity (MEID) of the mobile communication device 102a. In an embodiment, the data that is encoded in the unlocking tool 218 may be just a portion of the data found in the electronic serial number (ESN) or the mobile equipment identity (MEID). For example, the data may be an abbreviation or a truncation of the ESN and/or the MEID. The data may select predefined digits or characters of the ESN and/or MEID. In an embodiment, the electronic serial number (ESN) or the mobile equipment identity (MEID) is hashed to generate the data that is distinct and/or unique to the mobile communication device 102a. Once the mobile communication device 102a is partially unlocked, the retail clerk transmits a service provider application 224 from the carrier specific workstation 222 to the mobile communication device 102a.

In an embodiment, the service provider application 224 is configured to return the mobile communication device 102 to factory default settings. In an embodiment, returning the mobile communication device 102 to factory default settings may clear flags indicating a stolen status, change the electrophoretic display from indicating a stolen status to a blank status, and/or return functionality of the keys of a keyboard of the mobile communication device 102b. With the mobile communication device 102b returned to factory default settings, the mobile communication device 102b is returned to the user.

Figure 3:
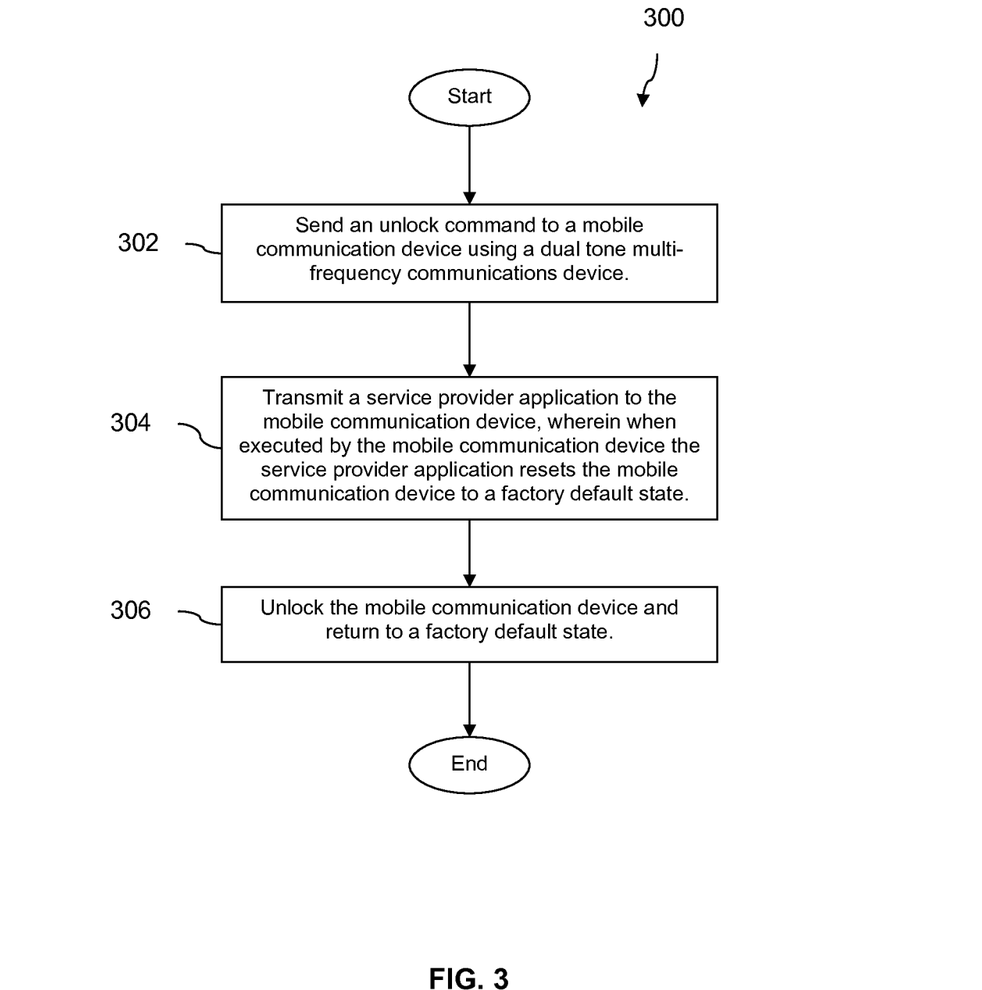
FIG. 3 is a flow chart of a method according to an embodiment of the disclosure.

In FIG. 3, a method 300 is described. At block 302, an unlock command is sent to a mobile communication device using a dual tone multi-frequency communications device; alternatively, another signal may be used. At block 304, a service provider application is transmitted to the mobile communication device, that when executed by the mobile communication device the service provider application resets the mobile communication device to a factory default state. At block 306, the mobile communication device is unlocked and returned to a factory default state, wherein flags indicating a stolen status are cleared, an electrophoretic display is changed from indicating a stolen status to a blank status, and/or the functionality of the keys on the keyboard of the mobile communication device is returned.

In an alternative embodiment, the functionality provided by the service provider application described above may be preloaded on the device, for example as a security application. In this case when the mobile device 102 is turned on while in the locked state, the preloaded security application would execute and begin listening for the dual tone multi-frequency communication signal having the unlock command through the headset jack. If the unlock command (encoded as a dual tone multi-frequency signal) is detected, the preloaded security application may reset the mobile communication device to factory default and unlock it.

Figure 4:
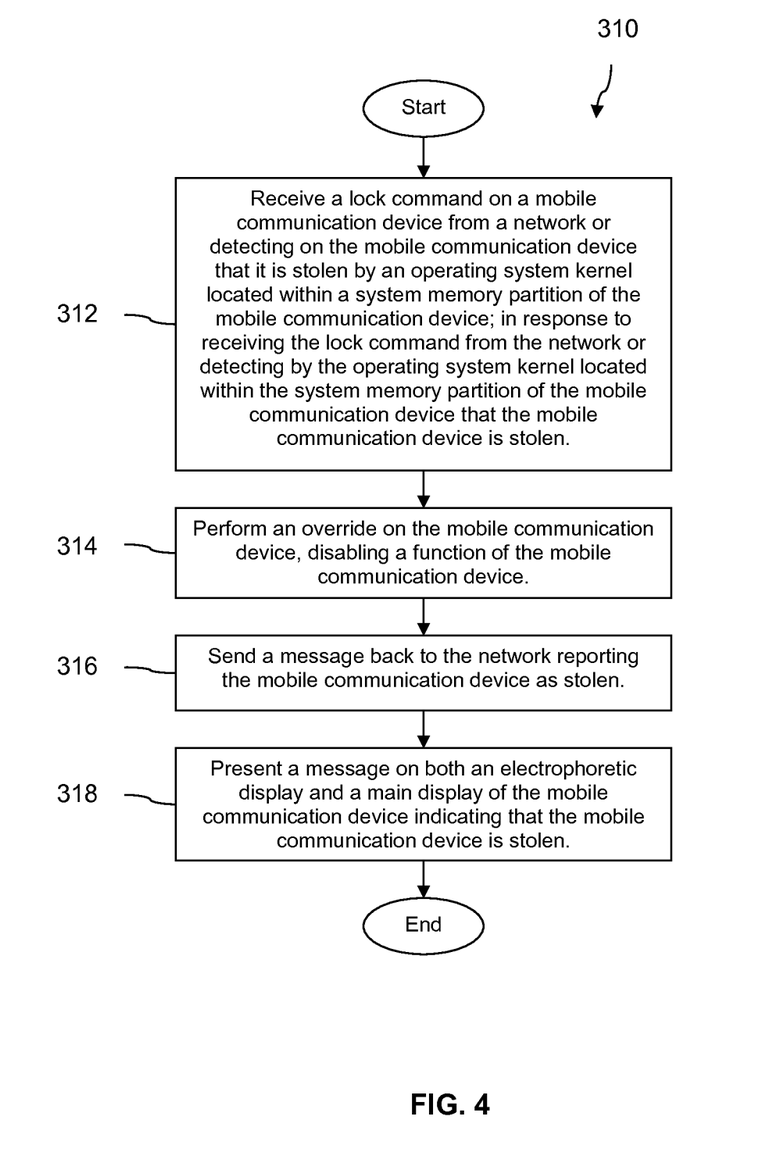
FIG. 4 is a flow chart of a method according to an embodiment of the disclosure.

In FIG. 4, a method 310 is described. At block 312, a mobile communication device receives a lock command from a network. Alternatively, the device detects that it is stolen by an operating system kernel located within a system partition in a memory of the mobile communication device. At block 314, the mobile communication device performs a lock function of the mobile communication device. At block 316, the mobile communication device sends a message back to the network reporting itself as stolen. At block 318, the mobile communication device presents a message on an electrophoretic display and/or a main display of the mobile communication device indicating that the mobile communication device is stolen.

Figure 5:
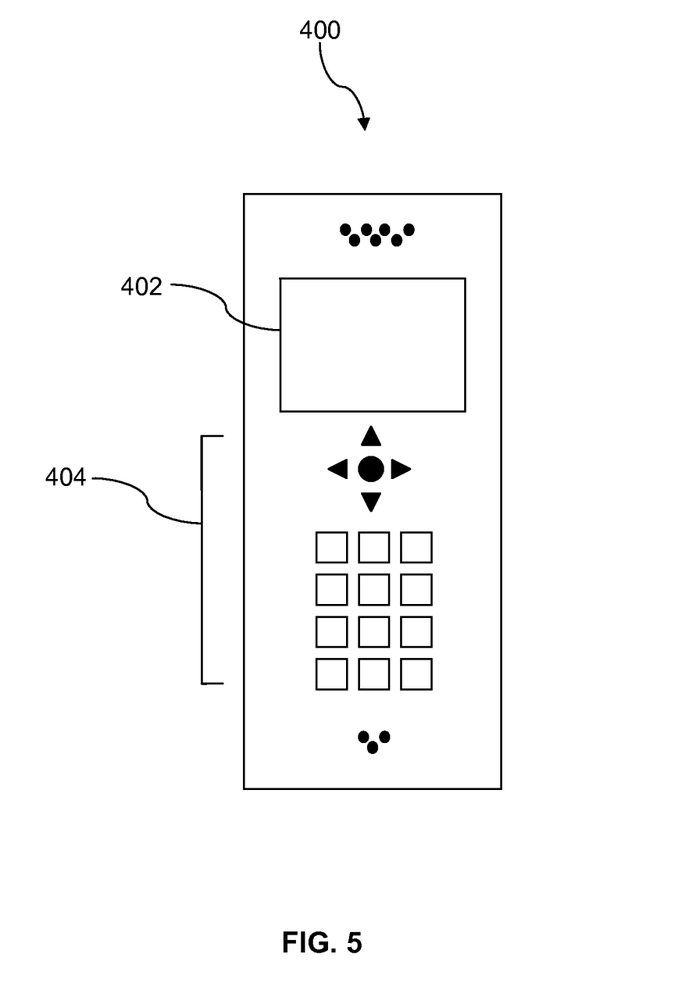
FIG. 5 is an illustration of a mobile communication device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
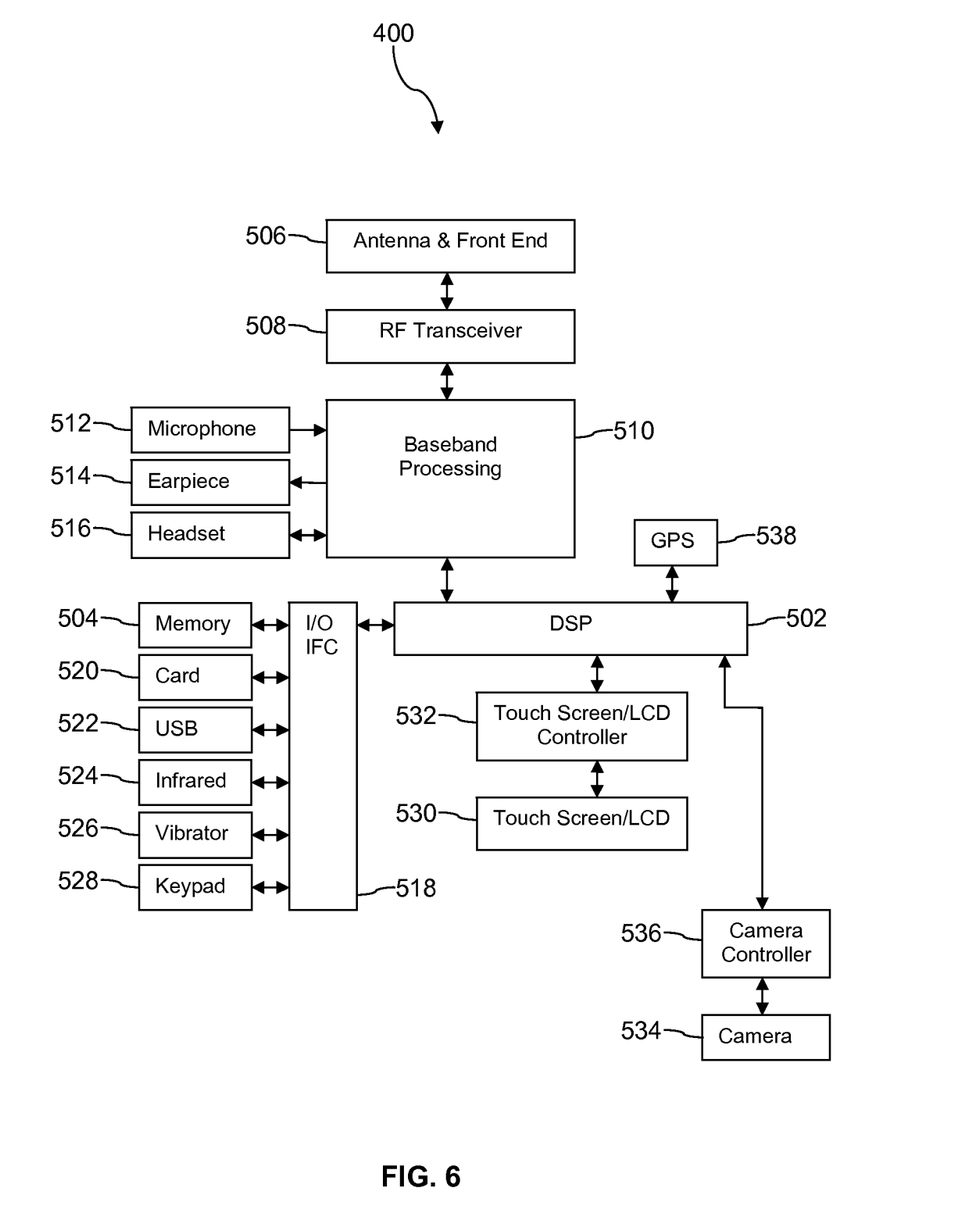
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
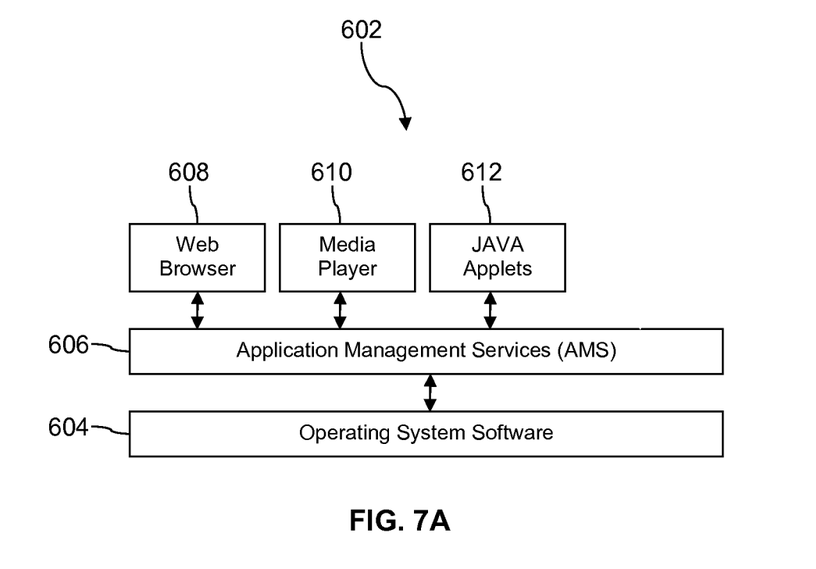
FIGS. 7A and 7B are block diagrams of software architecture for a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
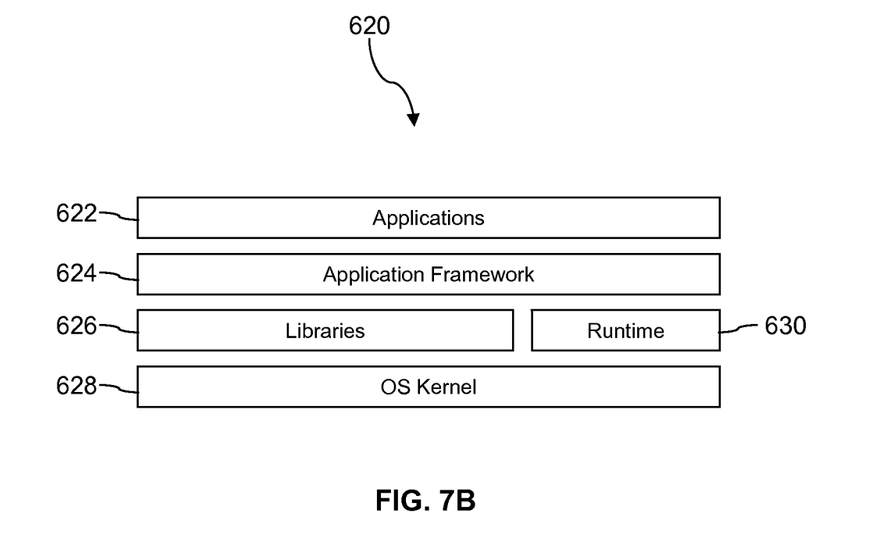

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
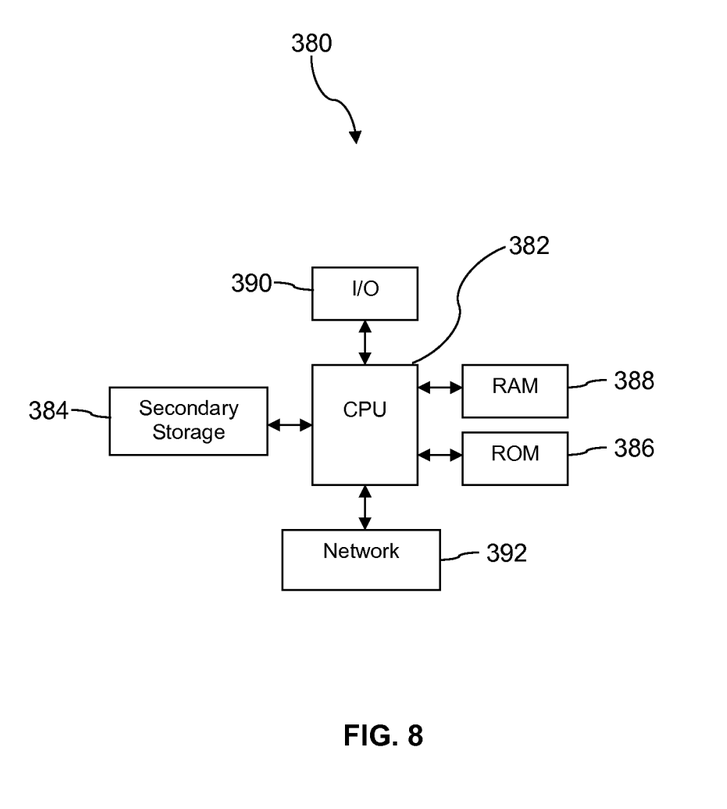
FIG. 8 illustrates an exemplary computer system suitable for implementing the several embodiments of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device that detects and responds to theft, comprising:
 a cellular radio transceiver;
 a processor;
 a memory, wherein the memory comprises a user partition and a system partition; and
 an operating system kernel stored in the system partition of the memory that, when executed by the processor:
  prevents unprivileged users from accessing the system partition,
  determines a theft status of the mobile communication device by comparing an electronic serial number (ESN) or a mobile equipment identity (MEID) associated with a component of the mobile communication device stored in the system partition with an ESN or a MEID stored in the component, and
  in response to a determination that the theft status is a stolen status based on the operating system kernel detecting at least one of a different pattern of usage or a flushing of contact information and building of different new contact information and at least one of a lack of correlation between the ESN or the MEID stored in the system partition and the ESN or the MEID stored in the component, performs at least one theft response selected from preventing boot-up of the mobile communication device, sending a message via the cellular radio transceiver indicating the theft status, commanding presentation of a theft alert message on a display of the mobile communication device, and disabling input functions of the mobile communication device.

2. The mobile communication device of claim 1, wherein the mobile communication device is one of a mobile phone, a personal digital assistant, or a media player.

3. The mobile communication device of claim 1, wherein the theft status is determined by an application in the operating system kernel located in the system memory partition of the mobile communication device which, during the boot up of the mobile communication device conducts an internal check of at least some of the components of the mobile communication device to confirm that the components match its known identity and that a component from a stolen mobile communication device has not been retrofitted into the mobile communication device.

4. The mobile communication device of claim 3, wherein the application in the operating system kernel has a memory of the ESN or the MEID for each of the components in the mobile communication device.

5. The mobile communication device of claim 1, wherein when a theft status is determined, the operating system kernel commands presentation of a message on an electrophoretic display of the mobile communication device indicating that the mobile communication device is stolen, turning on of an audible alarm, or disabling the keypad of the mobile communication device.

6. A method of a mobile communication device detecting and responding to theft, comprising:
 determining, by an operating system kernel stored in a system partition of a memory of a mobile communication device and executable by a processor included in the mobile communication device, a theft status of the mobile communication device by:
  analyzing a pattern of usage and a status of contact information stored in at least one of the system partition or a user partition; and
  comparing an electronic serial number (ESN) or a mobile equipment identity (MEID) associated with a component of the mobile communication device stored in the system partition with an ESN or a MEID stored in the component, wherein the operating system kernel prevents unprivileged users from accessing the system partition; and
 in response to a determination based upon the analysis and the comparison, that the theft status is a stolen status based on the operating system kernel detecting at least one of a different pattern of usage or a flushing of the contact information and building of different new contact information and at least one of a lack of correlation between the ESN or the MEID stored in the system partition and the ESN or the MEID stored in the component, performing, by the operating system kernel, at least one theft response selected from preventing boot-up of the mobile communication device, sending a message via a cellular radio transceiver of the mobile communication device indicating the theft status, commanding presentation of a theft alert message on a display of the mobile communication device, and disabling input functions of the mobile communication device.

7. The method of claim 6, wherein the mobile communication device is one of a mobile phone, a personal digital assistant, or a media player.

8. The method of claim 7, further comprising conducting, by an application in the operating system kernel located in the system memory partition of the mobile communication device during the boot up of the mobile communication device, an internal check of at least some of the components of the mobile communication device to confirm that the components match its known identity and that a component from a stolen mobile communication device has not been retrofitted into the mobile communication device in order to determine the theft status.

9. The method of claim 8, wherein the application in the operating system kernel has a memory of the ESN or the MEID for each of the components in the mobile communication device.

10. The method of claim 7, further comprising commanding, by the operating system kernel, in response to the determination of the theft status, presentation of a message on an electrophoretic display of the mobile communication device indicating that the mobile communication device is stolen, turning on of an audible alarm, or disabling the keypad of the mobile communication device.

11. The method of claim 10, wherein the electrophoretic display will show the message when the mobile communication device is turned off.

12. The method of claim 7, wherein the mobile communication device is configured to communicate using a radio transceiver according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another well-known wireless communication protocol.

13. The method of claim 7, further comprising, in response to the determination that the theft status is the stolen status, receiving a lock command on the mobile communication device.

* * * * *